H. VISSERING.
COUPLING.
APPLICATION FILED MAY 10, 1915.
1,234,104.
Patented July 17, 1917.
2 SHEETS—SHEET 2.
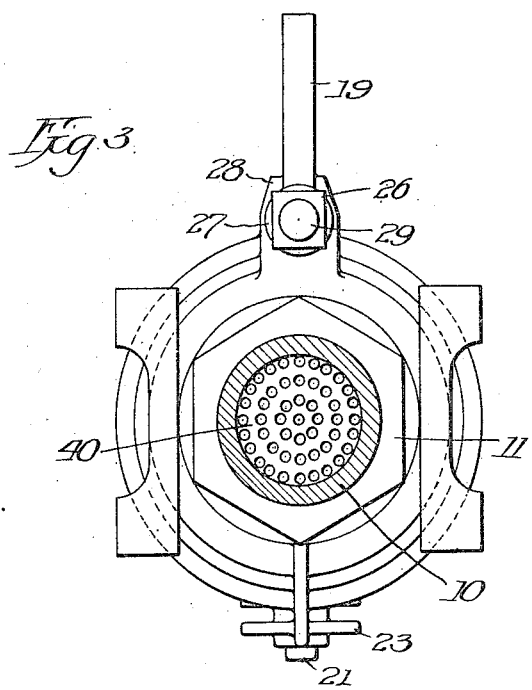
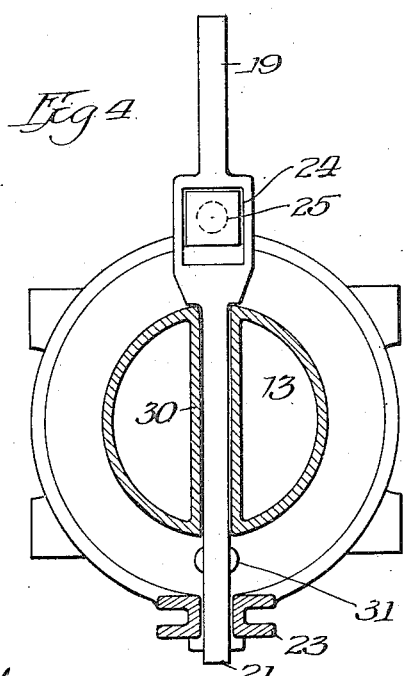
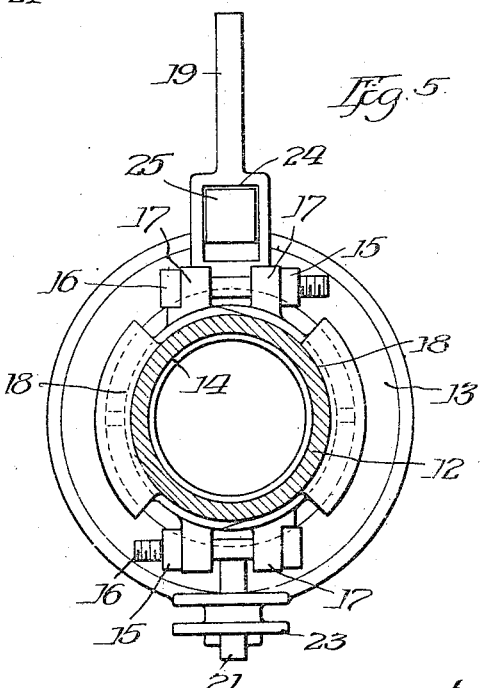
Witnesses
Inventor
Harry Vissering
by his attorney
Paul Carpenter

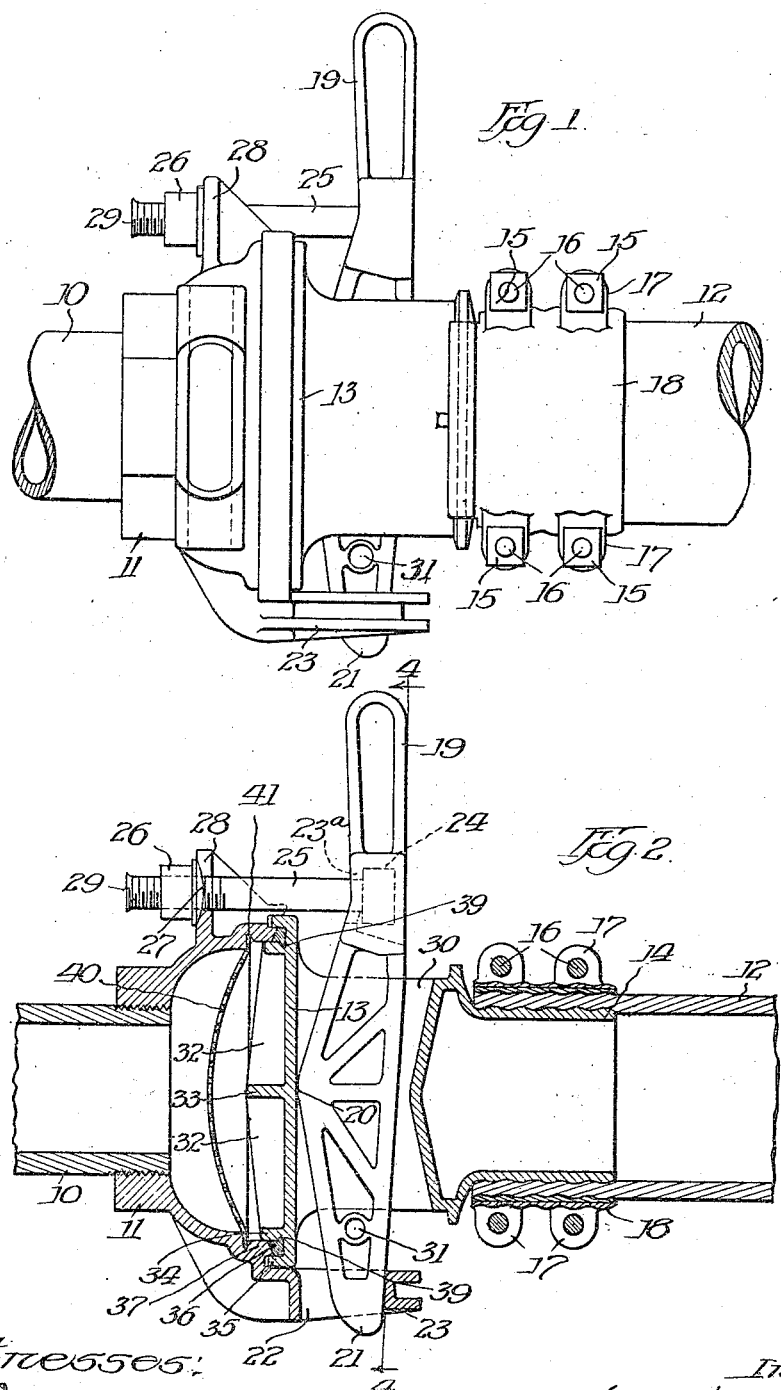

UNITED STATES PATENT OFFICE.

HARRY VISSERING, OF CHICAGO, ILLINOIS.

COUPLING.

1,234,104. Specification of Letters Patent. Patented July 17, 1917.

Application filed May 10, 1915. Serial No. 27,082.

*To all whom it may concern:*

Be it known that I, HARRY VISSERING, a citizen of the United States, and a resident of Chicago, in the county of Cook and State of Illinois, have invented certain new and useful Improvements in Couplings, of which the following is a specification.

This invention relates to improvements in couplings, more particularly those couplings adapted for connecting the water tank of a tender to the locomotive commonly known as "tender-hose couplers."

The principal objects of my invention are the provision of an improved form of coupling arranged so that the clamping member, which is the part most liable to wear out or break, is of standard form so that it can be readily replaced when necessary; the provision of improved means for clamping together the two halves of the coupling; the provision of means for exerting pressure centrally on one-half of the coupling in order to bring it into fluid-tight contact with the other half of the coupling; the provision of improved means for obtaining a fluid-tight joint in couplings of this type; the provision of means for guiding the two halves of the coupling into engagement; the provision of improved means for holding the gasket in position, and generally, to improve, simplify and cheapen the construction of couplings, particularly those adapted for use in connection with tender hose couplings.

To obtain the foregoing objects, and certain other objects and advantages which will be hereinafter disclosed, I have provided a construction one embodiment of which is illustrated in the accompanying drawings, in which:—

Figure 1 is a side elevation of the coupling;

Fig. 2 is a longitudinal vertical section of the coupling;

Fig. 3 is an end view of a coupling shown in Fig. 1 from the left-hand side thereof;

Fig. 4 is a section on the line 4—4 of Fig. 2, looking in the direction of the arrows; and Fig. 5 is an end view of the coupling shown in Fig. 1 viewed from the right-hand side thereof.

Referring now to Figs. 1 and 2 of the drawings, 10 represents a pipe of cast iron or the like onto which screws one member 11 of the coupling. 12 represents the flexible hose to which pipe 10 is to be connected by means of my improved coupling. This pipe 12 is connected to the other half of the coupling 13 by means of an integral corrugated sleeve 14 adapted to be inserted inside the end of the hose 12, whereupon the latter is then clamped securely thereon by tightening the nuts 15 of the bolts 16. The bolts 16 are arranged to pass through apertured ears 17 attached to substantially semi-circular clamping bands 18 arranged around the outside of the hose 12.

The two halves 11 and 13 of the coupling are clamped together by means of the lever 19 which is connected at either side of the coupling to the part 11 and arranged to bear centrally at the point 20 on the part 13 so that the pressure exerted thereby will be distributed evenly throughout the periphery of the member 13 and uniform engagement of the parts obtained.

The lever 19 is provided with a toe or lower end 21 adapted to extend through a slot 22 in the projecting portion 23 of the part 11 which limits the movement of the toe 21 away from the part 11. The other end of the lever 19 is provided with an aperture 23ª arranged at the bottom of a recess 24. The walls of this recess are made approximately to correspond with the shape of the head of the bolt 25 employed in tightening up the coupling. The other end of the bolt 25 is provided with a nut 26 which is preferably provided with a convex surface 27 so that it automatically centers itself in the correspondingly shaped part of the upstanding ears 28 between which the bolt 25 can pass. The end of the bolt is preferably upset or riveted, as shown at 29, to prevent the nut 26 becoming detached and lost.

In order to prevent escape of fluid around the sides of the lever 19, an elongated, tubular member 30 is provided through which the lever 19 is passed, as is best shown in Fig. 4. The lever 19 is prevented from slipping out of the tubular member 30 by means of a rivet 31 arranged between the projecting part 23 and the end of the tubular member 30.

The method employed for producing pressure centrally with respect to the member 13 has been described. It will, of course, be evident that the application of pressure centrally makes it desirable to stiffen the member 13 so that it will not become distorted when pressure is applied by the lever 19 as a result of the tightening of the nut 26. Accordingly, a pair of vertical flanges 32 is provided arranged so as to be substantially continuations of the longitudinal walls of the tubular part 30. A transverse web 33 is preferably provided which connects these two vertical flanges 32, as shown in Fig. 2.

The outer periphery of the part 13 is provided with two annular rings 34 and 35 between which a gasket 36 is arranged. The opposite half of the coupling 11 is provided with a single annular ring 37 adapted to enter slidingly the annular recess between the annular projections 34, 35 of the member 13. In this way the squeezing of the material employed for the gasket in a lateral or other direction is avoided. In this connection, however, attention is called to the fact that the annular recess which contains the gasket 36 is undercut at the point 39 so that when the parts are screwed together for the first time the material forming the gasket, which is preferably lead, is forced into this undercut part with the result that it is given wedge-shaped form which securely holds it in position, although the gasket ring was merely dropped into position in the first instance.

It will also be observed that the annular face of the ring 37 which comes in contact with the gasket is preferably made conical so as to be certain that a fluid-tight joint will be made between this annular ring and the gasket.

The usual filter plate 40 is arranged with its rim located in an annular recess 41 in the part 11.

It will further be observed that in order to protect the gasket 36 from injury, I extend the rings 34 and 35 so as to project beyond the plane of the outer surface of such gasket.

Having thus described my invention and illustrated its use, what I claim as new and desire to secure by Letters Patent is:—

1. A coupling comprising two members having coacting bearing surfaces, an open ended tubular member diametrically arranged in one member, a lever passing through said tubular member and connected at each end to the second member and intermediate such ends bearing substantially centrally and internally on said tubular member, and means for exerting pressure on said lever to clamp said members together and make a tight joint therebetween.

2. A coupling comprising two members having co-acting bearing surfaces, an open ended tubular member diametrically arranged in one member, a lever permanently arranged within said tubular member and detachably connected at each end to the second member, and intermediate such ends bearing substantially centrally on the first member, means for exerting pressure on said lever to clamp said members together and make a tight joint therebetween.

3. A coupling comprising two members having co-acting bearing surfaces, an open ended tubular member diametrically arranged in one member, a lever permanently arranged within said tubular member and capable of movement relatively to both said members, but adapted to engage at one end with the second member and adapted to bear centrally and internally on said tubular member adjacent the axis of the coupling and means for drawing the other end of said lever toward the second member, whereby a tight joint is produced therebetween.

4. A coupling comprising two members having coacting bearing surfaces, an open ended tubular member diametrically arranged in one member, a lever connected at both sides to the coupling of the other member and adapted to bear centrally and internally on said tubular member, and a member connected to said lever for exerting pressure on said lever to clamp said members together.

5. A coupling comprising two members having annular coacting bearing surfaces, an open ended tubular member diametrically arranged in one member, a lever connected at both sides to the coupling of the other member and adapted to bear centrally and internally on said tubular member, and a member connected to said lever for exerting pressure on said lever to clamp said members together.

6. A coupling comprising two members having coacting bearing surfaces, a lever capable of movement relatively to both said members but adapted to engage at one end with one member and adapted to bear on the other member adjacent the axis of the coupling, and means for drawing the other end of said lever toward the first-mentioned member and make a tight joint therebetween.

7. A coupling comprising two members having co-acting bearing surfaces, an open ended tubular member diametrically arranged in one member, a lever passing through said tubular member and capable of movement relatively to both said members, but adapted to engage at one end with the second member and adapted to bear centrally and internally on said tubular member adjacent the axis of the coupling, and means for drawing the other end of said lever toward the second member, whereby a tight joint is produced therebetween.

8. A coupling comprising in combination a pair of co-axial members, a clamping device passing through and longitudinally movable relatively to one of said members and adapted to bear against one side of the other thereof so arranged as to cause said members to approach without movement laterally from their axes, and a securing device at the side opposite to the bearing point for holding said two co-axial members in predetermined relation.

9. A coupling having a casing and an opening thereinto and means for closing said opening, a pair of bearing elements on one member, a bearing element on the other member adapted to enter the recess between said first mentioned pair of bearing elements, a gasket arranged in said recess, said recess having a radially undercut portion adapted to receive a portion of the gasket when pressure is applied thereto, a lever adapted to engage at one end with one member and adapted to bear on the other member adjacent the axis of the coupling, and means for drawing the other end of said lever toward said first mentioned member for clamping said members together to make a tight joint therebetween.

In testimony whereof I have hereunto signed my name in the presence of the two subscribing witnesses.

HARRY VISSERING.

Witnesses:
PAUL CARPENTER,
DONALD C. WILLIAMS.